J. KINZER.
Sausage Stuffer.
No. 29,385.
Patented July 31, 1860.
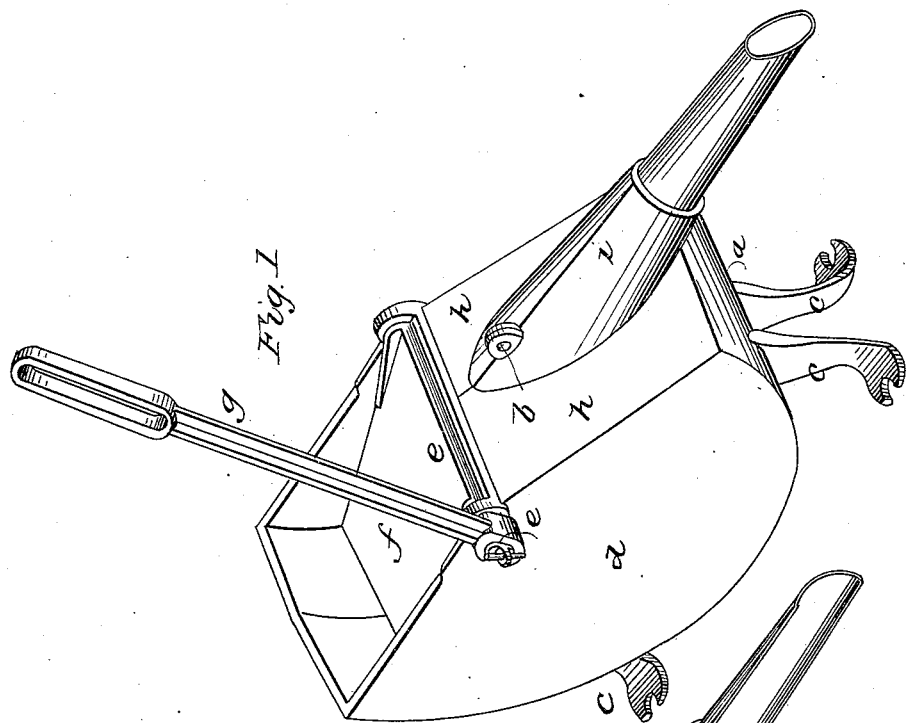
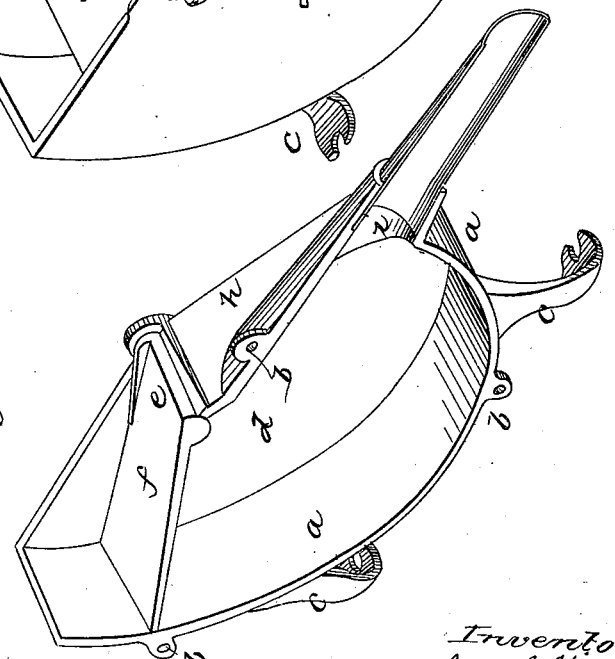

UNITED STATES PATENT OFFICE.

JACOB KINZER, OF PITTSBURG, PENNSYLVANIA.

SAUSAGE-STUFFER.

Specification of Letters Patent No. 29,385, dated July 31, 1860.

*To all whom it may concern:*

Be it known that I, JACOB KINZER, of Pittsburg, in the county of Allegheny and State of Pennsylvania, have invented a new and useful Improvement in Sausage-Stuffers; and I do hereby declare the following to be a full, clear, and exact description thereof, reference being had to the annexed drawing, forming part of this specification, in which—

Figure 1 is a perspective representation of my improved sausage stuffer. Fig. 2, is a longitudinal vertical sectional perspective view of the same.

In both figures, like letters of reference denote similar parts.

My improvement consists in making the body of the sausage stuffer of the shape of a sector of a hollow cylinder and attaching the nozzle on one of the radial sides of the sector, so that the plane of the side will form an acute angle with the axis of the nozzle, thereby with a nozzle of comparatively small diameter, presenting a very large opening for the passage of sausage meat, also placing the center of motion of the pressing flap in the center of the sectional body, and attaching the pressing flap thereto, within the cavity of the stuffer, thereby greatly increasing the efficiency, and simplifying the construction of the machine.

To enable others skilled in the art, to make and use my improved sausage stuffer, I will proceed to describe its construction and operation.

In the drawings $a$ is the body of the sausage stuffer. It is made of cast iron, and may be conveniently cast in two pieces, which are the counterparts of each other, the body $a$ being divided longitudinally in two equal parts which are fastened together by small bolts passed through the lugs $b$ $b$ $b$ Figs. 1 and 2. The shape of the body of the stuffer is that of a sector of a hollow cylinder, the sector being less than a semi-circle in the drawings, though a semi-circular sector would answer the purpose. The arc of the circle is placed downward, and is supported by four legs $c$ $c$, &c. The sides $d$ $d$ of the sector body are parallel to each other and at right angles to the axis of the cylinder of which the body is a sector. The shape of the body of the stuffer may be conveniently described by comparing it to a piece of an ordinary shaped cheese, somewhat less than a half, and cut by lines radiating from the center.

The pressing flap $f$ by which the sausage meat is forced into the nozzle, is a rectangular plate of the width of the inside of the body, and its length is equal to the diameter of the cylinder of which the body is a sector. This flap is made of one piece with its axis $e$, the journal of which, projecting beyond the sides of the flap, work in bearings at the center, that is, at the angle formed by the radii of the sector. To the axis $e$ of the pressing flap is attached the lever $g$ by which the axis $e$ is turned in its bearings.

One of the radial sides $h$ is covered, and the axis working close against the edge of the cover, at the center, prevents the escape of any sausage meat at that point. The other radial side is left open for the pressing flap to pass in and out, and for charging the body of the stuffer with meat. To the covered radial side $h$ of the body, is attached the nozzle $i$ which is a short tube tapering gradually. This tube connects with, and opens into the radial side $h$ with its axis not parallel thereto, but at a very acute angle therewith as seen in Fig. 2, so as to make an elliptical opening in the side of the body extending from the circumference of the sector to within a short distance of the center. The nozzle thus constructed is cast with the body of the stuffer, and is lengthened out by a tapering tin tube, inserted through the nozzle from inside.

The operation of my sausage stuffer as thus constructed, is very simple. The lever arm $g$ being pressed forward, causes the pressing flap to rise up out of the box. The meat is then placed in the box of the stuffer, and the lever arm is pressed backward, forcing the meat directly into the orifice of the nozzle. As the flap $f$ passes around and approaches the radial side $h$ the space occupied by the meat, will be wedge shaped, so that the pressure of the flap will tend to push the meat not only up into the nozzle, but forward and outward, and with great force.

The great advantage of this construction of sausage stuffer, is that the pressing flap is directly connected with and hinged to the body of the stuffer, so that it is not liable to get out of order, and is much stronger than any arrangement of cylinder and piston. Another advantage is that by dispensing entirely with the use of a cylinder and piston, the friction is very much reduced, as the flap does not touch the sides of the box at all, the only point of contact being around its axis.

Having thus described my improved sausage stuffer, what I claim as my invention and desire to secure by Letters Patent, is—

1. Constructing a sausage stuffer with a body or box having its interior the shape of the sector of a cylinder, and having a pressing flap hinged or pivoted at the center of the cylinder of which the body is a sector, substantially in the manner and for the purposes hereinbefore described.

2. Combining with a body and pressing flap, such as described, a nozzle opening into one of the radial sides of the sectional body or box at an acute angle thereto, so as to present a large opening for the passage of the meat, without increasing the diameter of the nozzle, substantially as described.

In testimony whereof, the said JACOB KINZER has hereunto set his hand.

JACOB KINZER.

Witnesses:
W. BAKEWELL,
M. G. CUSHING.